US011593492B2

(12) United States Patent
Wysopal et al.

(10) Patent No.: US 11,593,492 B2
(45) Date of Patent: Feb. 28, 2023

(54) ASSESSMENT AND ANALYSIS OF SOFTWARE SECURITY FLAWS

(71) Applicant: Veracode, Inc., Burlington, MA (US)

(72) Inventors: Christopher J. Wysopal, Concord, MA (US); Christopher J. Eng, Lexington, MA (US)

(73) Assignee: Veracode, Inc., Burlington, MA (US)

( * ) Notice: Subject to any disclaimer, the term of this patent is extended or adjusted under 35 U.S.C. 154(b) by 168 days.

(21) Appl. No.: 16/988,196

(22) Filed: Aug. 7, 2020

(65) Prior Publication Data

US 2020/0364350 A1 Nov. 19, 2020

Related U.S. Application Data

(63) Continuation of application No. 16/398,155, filed on Apr. 29, 2019, now Pat. No. 10,776,497, which is a continuation of application No. 14/721,585, filed on May 26, 2015, now Pat. No. 10,275,600, which is a continuation of application No. 12/884,544, filed on Sep. 17, 2010, now Pat. No. 9,069,967, which is a continuation-in-part of application No. 12/819,627, filed on Jun. 21, 2010, now abandoned, which is a continuation-in-part of application No. 12/031,918, filed on Feb. 15, 2008, now Pat. No. 8,499,353.

(60) Provisional application No. 61/243,735, filed on Sep. 18, 2009, provisional application No. 60/901,874, filed on Feb. 16, 2007.

(51) Int. Cl.
*G06F 21/57* (2013.01)
*G06F 11/36* (2006.01)

(52) U.S. Cl.
CPC ........ *G06F 21/577* (2013.01); *G06F 11/3612* (2013.01); *G06F 2221/033* (2013.01)

(58) Field of Classification Search
None
See application file for complete search history.

(56) References Cited

U.S. PATENT DOCUMENTS 5,715,403 A 2/1998 Stefik
5,864,871 A 1/1999 Kitain et al.
(Continued)

FOREIGN PATENT DOCUMENTS

WO 2004003706 A2 1/2004

OTHER PUBLICATIONS

U.S. Appl. No. 16/398,155, Non-Final Office Action, dated Jan. 17, 2020, 12 pages.
(Continued)

*Primary Examiner* — William J. Goodchild
(74) *Attorney, Agent, or Firm* — Gilliam IP PLLC

(57) ABSTRACT

At least a static analysis and a dynamic analysis to perform for a first software application are determined based, at least in part, on a profile of the first software application. The first software application is analyzed with the static analysis to generate static analysis results. The first software application is analyzed with dynamic analysis to generate dynamic analysis results. An assessment report is generated based on the static analysis results and the dynamic analysis results, wherein the assessment report indicates a security score of the first software application that is based, at least in part, on the static analysis results and the dynamic analysis results.

20 Claims, 11 Drawing Sheets

(56) References Cited

U.S. PATENT DOCUMENTS

| | | | |
|---|---|---|---|
| 5,892,900 | A | 4/1999 | Ginter et al. |
| 6,631,473 | B2 | 10/2003 | Townsend |
| 7,284,274 | B1 | 10/2007 | Walls et al. |
| 7,421,621 | B1 | 9/2008 | Zambrana |
| 7,784,099 | B2 | 8/2010 | Benjamin |
| 7,913,303 | B1 | 3/2011 | Rouland et al. |
| 8,423,975 | B1 | 4/2013 | Scallon |
| 2001/0007147 | A1 | 7/2001 | Goldschmidt Iki et al. |
| 2001/0020272 | A1 | 9/2001 | Le Pennec et al. |
| 2002/0023217 | A1* | 2/2002 | Wheeler .......... G06Q 20/40975 713/171 |
| 2003/0009696 | A1 | 1/2003 | Bunker et al. |
| 2003/0037314 | A1 | 2/2003 | Apuzzo et al. |
| 2003/0050814 | A1 | 3/2003 | Stoneking et al. |
| 2003/0061283 | A1 | 3/2003 | Dutta et al. |
| 2003/0131290 | A1 | 7/2003 | Weinberg et al. |
| 2003/0159063 | A1 | 8/2003 | Apfelbaum et al. |
| 2003/0195861 | A1* | 10/2003 | McClure ............. H04L 63/1408 |
| 2003/0204805 | A1 | 10/2003 | Prabhu |
| 2004/0073445 | A1 | 4/2004 | Mellinger et al. |
| 2004/0102923 | A1 | 5/2004 | Tracy et al. |
| 2004/0139370 | A1 | 7/2004 | Bailey et al. |
| 2004/0153792 | A1 | 8/2004 | Merriam |
| 2004/0167749 | A1 | 8/2004 | Friedman et al. |
| 2004/0267700 | A1 | 12/2004 | Dumais et al. |
| 2005/0108037 | A1 | 5/2005 | Bhimani et al. |
| 2005/0108562 | A1* | 5/2005 | Khazan ............... G06F 11/3604 726/23 |
| 2005/0138426 | A1 | 6/2005 | Styslinger |
| 2005/0160335 | A1 | 7/2005 | Peterson |
| 2006/0021055 | A1 | 1/2006 | Judge et al. |
| 2006/0095967 | A1 | 5/2006 | Durham et al. |
| 2006/0136424 | A1 | 6/2006 | Nuggehalli et al. |
| 2006/0167749 | A1 | 7/2006 | Pitkow et al. |
| 2006/0190769 | A1 | 8/2006 | Doddapaneni et al. |
| 2006/0218639 | A1 | 9/2006 | Newman et al. |
| 2006/0277607 | A1 | 12/2006 | Chung |
| 2007/0006037 | A1 | 1/2007 | Sargusingh et al. |
| 2007/0055482 | A1 | 3/2007 | Goodermote et al. |
| 2007/0083933 | A1 | 4/2007 | Venkatapathy et al. |
| 2007/0101433 | A1 | 5/2007 | Louch et al. |
| 2007/0180490 | A1 | 8/2007 | Renzi et al. |
| 2007/0261061 | A1 | 11/2007 | Staniford et al. |
| 2007/0294766 | A1 | 12/2007 | Mir et al. |
| 2008/0005782 | A1 | 1/2008 | Aziz |
| 2008/0127101 | A1 | 5/2008 | Anafi |
| 2008/0204763 | A1 | 8/2008 | Turbell et al. |
| 2008/0209566 | A1 | 8/2008 | Ziv |
| 2008/0209567 | A1 | 8/2008 | Lockhart et al. |
| 2009/0254993 | A1 | 10/2009 | Leone |
| 2009/0282476 | A1 | 11/2009 | Nachenberg et al. |
| 2010/0281248 | A1 | 11/2010 | Lockhart et al. |
| 2011/0173693 | A1 | 7/2011 | Wysopal et al. |

OTHER PUBLICATIONS

U.S. Appl. No. 16/398,155, Notice of Allowance, dated May 18, 2020, 7 pages.

International Search Report for PCT/US2008/002025, dated Sep. 2, 2008, 4 pages.

Written Opinion of the International Searching Authority for PCT/US2008/002025, dated Sep. 2, 2008, 6 pages.

Bohme, "A Comparison of Market Approaches to Software Vulnerability Disclosure", Springer-Verlag Berlin Heidelberg, 2006, 14 pgs.

Di Lucca, et al., "Testing Web-based Applications: The State of the Art and Future Trends", Information and Software Technology, 2006, pp. 1172-1185.

* cited by examiner

ASSESSMENT AND ANALYSIS OF SOFTWARE SECURITY FLAWS

FIELD OF THE INVENTION

The invention relates generally to the identification and reporting of flaws in software programs.

BACKGROUND

In recent years, many companies and government agencies have been exposed to negative press and legal proceedings due to high-profile security breaches in which sensitive data has been either inadvertently disclosed or stolen. While many of these incidents were the result of human error, a significant percentage was traced back to poorly designed software architecture and/or applications. Conventional techniques for testing software applications can identify many vulnerabilities, but no one methodology is failsafe. Furthermore, although many security-analysis techniques require significant time and resources to administer, not every application necessitates the same level or degree of analysis.

As a result, companies face a difficult trade-off between the desire to test software and limitations on available resources and time. Moreover, many companies do not have the expertise to apply some of the more intricate and complex security assessment techniques, and thus look to industry experts for such services. This creates yet another challenge, in that often what is being tested is highly sensitive, proprietary software.

There are a myriad of testing and assessment techniques for validating various properties of software applications and network implementations. However, one of the most critical processes for ensuring that the deployment of software does not expose an organization to unacceptable risks is security and vulnerability testing. Some of the conventional techniques used to perform such testing includes static analysis (automated code review), dynamic analysis (automated penetration testing) and manual analyses such as code review, design review, and manual penetration testing. All of these analysis techniques are aimed at finding security weaknesses and vulnerabilities in an application and typically provided in report format to the programmers, product managers and quality assurance (QA) staff. The report can provide detailed results (e.g., program names, line numbers, variable names, data connections, etc.) as well as a summary of the results. The report may be a conventional document such as a text file or a structured XML file.

However, once the report is run and reviewed by a QA engineer or product manager, it is typically no longer referenced or used. Furthermore, as an executable or application is implemented and/or provided to a customer, the report is forever decoupled from the software that was tested. In fact, an individual or organization using software has no knowledge that a report was ever created or used to analyze the software they are now using.

As such, valuable information about what aspects of the application were tested, how secure certain features or functions may be and what testing methodologies were used are unknown to those that value such information. What is needed, therefore, is a system and associated techniques that can not only produce vulnerability and security test reports using various testing methodologies, but can create and maintain links between the application and its test results as the applications are deployed and throughout their lifecycle.

SUMMARY OF THE INVENTION

In general, the present invention facilitates security assessment and vulnerability testing of software applications in a manner responsive to the technical characteristics and the business context in which the application operates (collectively, "application metadata"). The invention may, for example, determine an appropriate assurance level and test plan to attain it. In many instances, a test plan may dictate performance of different types of analyses. In such cases, the individual tasks of each test are combined into a "custom" or "application-specific" workflow, and the results of each test may be correlated with other results to identify a wide range of potential vulnerabilities and/or faults that are detected by the different tests. As such, a programmer reviewing the results can better understand how different potential vulnerabilities may relate to each other or in fact be caused by a common flaw.

Furthermore, once an application is deployed, the universe of threats that may impact the application continues to expand, and therefore the platform preferably provides the infrastructure and methods for continuous, periodic or event-triggered application assessments, even as the application operates in a secure production environment. Application users and/or owners may also simultaneously view both the application "infrastructure" (e.g., source code, architectural components, object code abstractions, user case diagrams, UML diagrams, and/or website maps) as it exists in their operational environments and the results of the periodic security assessments, which can remain stored within the analysis platform. For example, in one implementation, the analysis platform runs on a server accessible to the application user via the Internet. The server periodically uploads (or otherwise accesses) the application, performs a security analysis, and alerts the user to the results. Application owners and/or users may access the results of this and previous assessments, which are stored on (or retrievable by) the server.

Accumulating both application-specific metadata and security analysis and assessment results for numerous applications from many companies facilitates benchmarking of applications against other applications at many levels within an organization. Use of various "anonymizing" and "scrubbing" techniques (i.e., removing any information that could be deemed proprietary and/or identify an application's user or owner) permits the sharing of assessment data among otherwise unrelated entities. Benchmarking may take place on a global scale (i.e., across all applications being monitored), within particular subsets of applications (e.g., those from a specific industry and/or working with a specific technology), or based on personnel (e.g., for a particular developer, team, organization or company).

Therefore, in a first aspect, a computer-implemented method for providing access to security data related to a software application includes creating a programmatic association between results of security analysis tests performed against a software application and the software application and storing the results for subsequent electronic access. Further, instructions to access the results are provided such that users of the software application may review the results on demand.

The software application may include object code distributed over a network, in which case the results may be distributed with the executable object code. In other cases, the software application may be an application package, and the results are included in the application package. The software application may also be a web-based service accessible over a network and/or a collection of unrelated computing functions available over the Internet. The results may be stored in a centralized database, access to which may be limited based on user authentication credentials. In certain cases, the database stores results from multiple software applications such that the results for each software application are individually accessible based on a unique key. The results may be displayed and/or transmitted to the user over a network (encrypted, in some cases), and done so in response to a query submitted to the database. In some implementations, a hash function is used against at least a portion of the software application. The computed hash may then be included with the distributed application, and, upon receiving a request from the user to view the results that includes the hash, the hash may be used to identify and access the results. In some cases the instructions to access the report comprise a URL directing the user to the report, which may be formatted as an XML document having predefined tags.

In another aspect, a system for providing access to security data related to a software application includes testing engines for performing a plurality of vulnerability tests on the software applications and associating results of the tests with the respective application. The system also includes a database for storing the results and a communications server for receiving a request from a user of one of the software applications to access the results associated with the application, and, based on the received request, provide (and in some cases display and/or transmit) the results associated with the application to the user.

The software application may be executable object code and distributed over a network, and in some cases an application package such that the results may be included in the application package. In other instances the software application may be a web-based service accessible over a network and/or a collection of unrelated computing functions available over the Internet. The results associated with each software application may be individually accessible based on a unique key. For example, the testing engine may compute a hash of at least a portion of the software application, and the communication server then includes the hash with the distributed application. Upon receiving a request from the user to view the results that includes the hash, the communications server and database use the hash to identify and access the results.

Other aspects and advantages of the invention will become apparent from the following drawings, detailed description, and claims, all of which illustrate the principles of the invention, by way of example only.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention

DETAILED DESCRIPTION

Architecture and Approach

Figure 1:
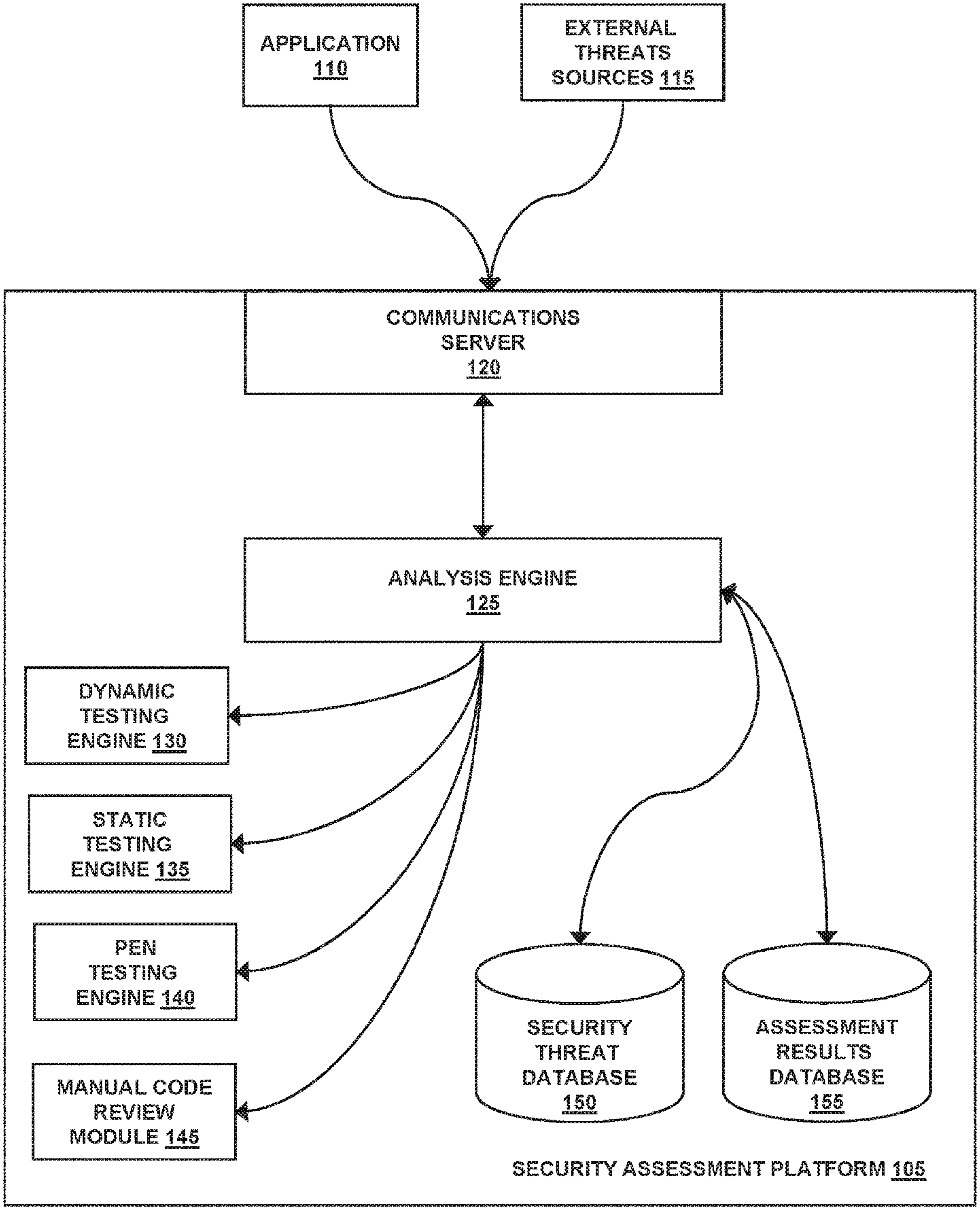
FIG. 1 is a block diagram of a software assessment and testing domain according to an embodiment of the invention.

The techniques and supporting systems described herein provide a comprehensive and customizable approach to detecting security flaws in software applications, recommending remedial courses of action, and reporting and benchmarking against, for example, industry-wide statistics, other developers and/or other development teams from within or outside of an organization. Software applications may include (but are not necessarily limited to) any sort of instructions for a machine, including, for example, without limitation, a component, a class, a library, a script, an applet, a logic table, a data block, or any combination or collection of one or more of any one or more of these. An appropriate level, type and frequency of security analysis needed for a software application may depend on many factors, including (but not necessarily limited to) the technical details of an application (e.g., the language in which it is written and the platform on which is to be deployed) as well as the business context in which the application operates. For example, an application that is "customer-facing" and facilitates high-volume, secure transactions such as banking or ecommerce will require rigorous testing to ensure that customer data is not jeopardized. Conversely, applications such as document-control systems or desktop applications that are implemented entirely within an organization and operated behind secure firewalls require less stringent testing. Therefore, balancing the added costs for executing additional security assessments and testing with the risks of potential for losses is critical FIG. 1 illustrates, in a broad overview, a representative security assessment platform 105 for implementing the techniques described herein. The platform 105 receives and reports on software applications 110 from multiple entities, while monitoring numerous sources 115 of external threats for up-to-date libraries of malware and application and environmental vulnerabilities. The platform 105 includes a communications server 120 and an analysis engine 125. The communications server 120 provides the conduit through which the platform interacts with external systems. For example, the communications server 120 may utilize conventional data-communications protocols such as TCP/IP, HTTP and others to query application servers for updated application programs, download updated programs, post analysis results, and send and receive messages from users. More specifically, in a server-based implementation, the communications server 120 may act as an interface between the platform 105 and external entities that submit software applications for assessment or review assessment results. In addition, the communications server 120 may act as a conduit through which other external data such as updated threat information (in the form of malware definition files, for example) are received for storage in the security threat database 150. In some implementations, the security assessment platform 105 may be configured as a distributed platform, in which one or more components (e.g., testing modules, threat-assessment agents, secure communication devices, databases, etc.) are duplicated and/or distributed among multiple computers located remotely from each other but, for example, co-located with users of the platform. Examples of communications server application platforms providing such features include the Apache HTTP Web Server supplied by the Apache Software Foundation and the Web Sphere HTTP Server supplied by IBM Corporation.

The analysis engine 125 receives application code and programs from users, either via the entity operating the platform 105 or directly from customers using the platform 105 as a subscription service. The analysis engine 125 interacts with various testing engines and code review modules, as well with assessment and threat databases, and includes benchmarking and reporting capabilities for comparing assessment results among applications, developers, teams and/or organizations. In one embodiment, for example, the analysis engine 125 interacts with a dynamic testing engine 130, a static testing engine 135, a pen testing engine 140 and a module for performing manual code review 145.

More specifically, the dynamic testing engine 130 interacts with the application 110 as an external entity and executes the application 110 in a manner that mirrors or emulates the runtime environment in which it operates. In some embodiments, the dynamic testing engine 130 receives a description of the interfaces to the application 110, sends test and/or simulation data to the application via the interfaces, and analyzes the received responses. The test data may be application-specific (e.g., provided with the application as a library, data file, or structured input) or application-agnostic, such as data and/or scripts known to exploit application vulnerabilities. Based on the responses, the dynamic testing engine 130 determines whether any security defects exist in the application 110 and the extent to which it may be vulnerable to certain threats. The defects may be reported in real-time (e.g., via the communications server 120) and/or stored in a database for subsequent analysis and reporting.

The static testing engine 135 receives a binary or bytecode version of the application 110 as input. For example, a high-level semantic model of the application 10 is created containing control-flow and data-flow graphs of the application 110, and this model then analyzed for quality defects, including security flaws, by a set of analysis scans.

The pen testing engine 140 performs penetration testing of the application 110. Penetration testing includes, for example, simulating and analyzing various web-based interactions between a client and the server on which the application 110 operates. This includes executing standard HTTP commands such as GET and POST, analyzing FORM elements and scripting elements (both client and server-side), and manipulating inputs to elicit known vulnerabilities.

The analysis engine 125 may also receive input from manual review processes executed using a manual code review module 145. Manual review processes typically include a human operator visually reviewing source code to determine if proper coding form and standards have been followed, and looking for "extra" functions often left in applications such as trap doors, easter eggs, and similar undocumented functionality.

For web-based applications, a dynamic web scan may be used to "crawl" through the application by manually navigating the web site to be tested. In this manner, a person or automated "bot" interacts with all (or some selected subset) of the user interface elements and enters valid data. In some cases, pre-defined invalid data (either in format or substance) may be included to test the application's response. In some cases, an automated testing process such as a regression test harness may also be used. During the crawl, a browser plug-in or a proxy running on the client records all web requests to and responses from the web application. After the crawl has successfully navigated the web application, the recording process is stopped. The recorded requests and responses may be uploaded to the analysis engine 125. In some instances the crawl may be performed by the entity operating the platform 105, whereas in other instances the crawl may be performed by the owner of the application being tested, and the resulting data and application loaded into the platform together.

The data, scripts and functions used to operate the various testing engines and the analysis engine 125 may be stored in a security-threat database 150. The database 150 may be operated as a stand-alone server or as part of the same physical server on which the analysis engine 125 operates. Portions of the threat database 150 may, in some cases, be provided by entities other than the entity operating the platform 105 on a subscription basis, allowing the database 150 to be kept up to date as threats and malware evolve over time. Likewise, the results of each test and the overall analysis process may be stored in an assessment-results database 155. In some embodiments, the applications and analysis results are stored in an encrypted format using a unique key provided to the owner of the analyzed application 110 such that only it can access and review the results of the analysis. In such cases, decryption of the analysis is limited to authorized personnel and all traces of the analysis are deleted from memory (other than the database 155) following completion.

Examples of database applications that may provide the necessary features and services include the MySQL Database Server by Sun Microsystems, the PostgreSQL Database Server by the PostgreSQL Global Development Group of Berkeley, Calif., or the ORACLE Database Server offered by ORACLE Corp. of Redwood Shores, Calif.

Figure 2:
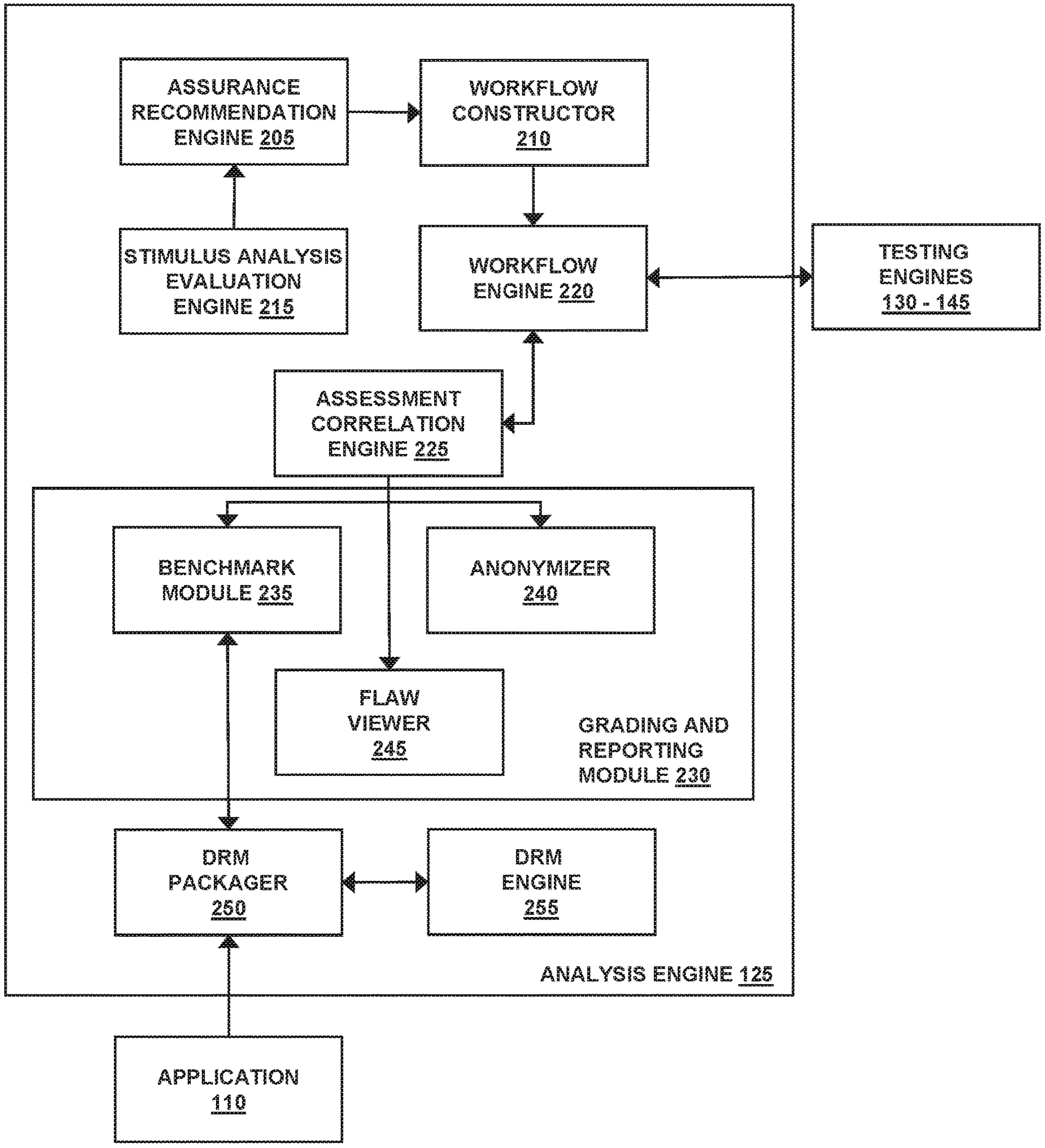
FIG. 2 is a more detailed diagram of a software analysis engine according to an embodiment of the invention.

FIG. 2 illustrates, in greater detail, the analysis engine 125 and its various components. In one embodiment, the analysis engine 125 includes an assurance recommendation engine 205, a workflow constructor 210, a stimulus analysis evaluation engine 215 and a workflow engine 220. Each of these components (described in greater detail below) interacts with the various testing engines 130-145 and executes various processes in accordance with an application-specific testing workflow, which is defined by an assessment correlation engine 225. Results from the analysis and testing are provided to a grading and reporting engine 230, which includes a benchmark engine 235, an anonymizer 240 and a flaw viewer 245. In some embodiments, such as those where the analysis and testing services are provided remotely and/or via a web-based subscription service requiring transmission of application components and results over public networks (i.e., the Internet), a digital rights management packager 250 and engine 255 may be used to encrypt the application and analysis results.

More specifically, the assurance recommendation engine 205 receives applications and application metadata and automatically determines various characteristics of the application. For example, the recommendation engine 205 may recognize the programming language used to write the application 110, specific libraries used within the application, the development environment used to build the application, application programming interfaces (APIs) available to users, the size of the application, as well as other technical qualities. Moreover, the entity responsible for submitting the application (which may be the owner of the application, a licensee, or an end user) may provide additional business context information such as the required availability (e.g., 99.99% uptime), expected throughputs or transaction volumes, types of users who will operate the application, whether the application will be exposed to the public, the operating system in which the application executes, other applications with which the application interacts, and others.

The metadata is supplied by the entity operating the platform, the owner of the application, or, in some cases, may be provided by a third party. In such cases, the metadata may include information related to the specific application, a group of applications (e.g., all banking applications within a retail bank), an enterprise-wide collection of applications, or, in some cases, industry-wide data.

The recommendation engine 205 considers these technical and business characteristics and application metadata and determines a recommended assurance level. As described in more detail below, the assurance levels are used by the workflow constructor 210 to define an assessment workflow based on various testing techniques such as dynamic application testing, static binary testing, automated and manual pen testing, as well as manual code review.

Once a workflow has been established by the workflow constructor 210, a workflow engine 220 submits the application to the various testing engines. The results of these tests may include such items as error rates, specific occurrences of errors, compliance with industry standards, as well as other data. The assessment correlation engine 225 correlates the different test results received from the testing engines 130-145 and organizes them by application module and type of error, identifies duplicates, and recognizes correlations among different errors.

The analysis engine also may include a grading and reporting module 230 that includes a benchmark module 235, an anonymizer 240 and a flaw viewer 245. The benchmark module 235 compares the testing and analysis results for one or more applications having similar application profiles and/or metadata. This allows the application's owner to see how the application's architecture and security features measures up against other similar applications.

In some instances, the benchmark engine 235 calculates and compares test results at a more granular level. For example, an organization may wish to determine which of its developers (or development teams) produces the best code, the most secure applications, or is most prone to development errors. By including information such as the code author, development group, and/or other organizational information, the platform may be used within a company to identify core strengths and/or key weaknesses.

The anonymizer 240 removes company-specific information from the results and/or aggregates the results such that they may be provided to subscribers or the public in general. In this manner, the platform 105 provides global view of software development and implementation trends related to security and vulnerability testing across a wide spectrum of industries and technologies.

As an example, a bank may be developing a new customer service application that allows its clients to execute transactions via the Web. Based on the technology used to develop the application (e.g., Active Server Pages, java, PHP), the fact that the application is available to the general public, and the information transmitted is highly sensitive (account numbers, PINs, etc.), the assurance recommendation engine 205 may determine that this application be tested as fully as possible. Each testing engine will then process the application (either remotely or as received at the platform 105) and the results are correlated into a comprehensive assessment report. Once completed, project managers at the bank may log into the platform using secure IDs and passwords, biometric authentication, PKI techniques or other such methods and, using the flaw viewer 245, review and comment on any vulnerabilities identified during testing. On some cases, the project managers may also see how the application fared against similar applications submitted by other banks.

In some embodiments, the vulnerability and quality scans are performed during the development of an application, and as such the results may be shared with the development team in real-time. This allows programmers and project managers to be apprised of potential flaws in their code prior to system testing or deployment, greatly reducing the time and cost to implement large-scale systems. In some cases, ongoing trends derived from industry-wide statistics (e.g., a bank's peer group is shifting to a newer, more secure java framework, or has migrated from MySQL to Oracle) are provided to help guide developers' efforts. In other instances, the prevalence of certain code across an enterprise or industry (e.g., commonly-used open source components, for example) is tracked over time and periodic updates may be sent to developers know to be using the code if newly discovered issues (technical, legal or both) are identified.

Regardless of the implementation, the method of implementing and distributing the various components of the platform is arbitrary. For example, in some implementations all components of the platform may be completely contained within an organization (e.g., within a firewall, accessible via a VPN or intranet) and available as an "on-demand" service as part of an overall development methodology. In other embodiments, the platform may be implemented as a web-based service available to numerous organizations that "subscribe" to the platform and are therefore able to subject their software applications to structured security assessment testing on an as-needed basis. Furthermore, various "anonymizing" or aggregation techniques can be used to remove or otherwise protect proprietary information and/or data that would identify the application owner. Assessment results from numerous applications across industries, technical platforms, application sizes, etc. can be extracted to provide cross-entity benchmarking data to platform subscribers. In addition, analysis of the assessment results and subsequent monitoring of the applications (for undetected security flaws or unexpected operational reactions to certain threats, for example) allow the platform 105, and specifically the workflow engine 220, to be refined and improved. By operating the platform 105 as a centralized yet secure resource for multiple entities, assessment data can be used for historical and industry benchmarking, as well as to upgrade the techniques used to determine assurance levels and built appropriate workflows.

In such cases, the need to securely transmit application code (both binary and source) to and from the platform 105 is crucial. One method for implementing the needed security measures is via digital rights management (DRM). In general, DRM refers to various access control technologies used by publishers and copyright holders to limit access to and/or usage of digital media or devices. Just as DRM is used to protect conventional copyrighted material (e.g., audio and video content), it may also be employed to protect source and binary code of an application as well the analysis and testing results generated by the platform 105. More specifically, a DRM packager 250 may be used to encrypt some or all of the application information and produce a key to decrypt the information. A DRM engine 255 executes the encryption and decryption functions that allow users to securely view application data via a remote device. Further operational and functional characteristics of DRM modules 250, 255 are set forth below.

Assessment and Recommendation

Figure 3:
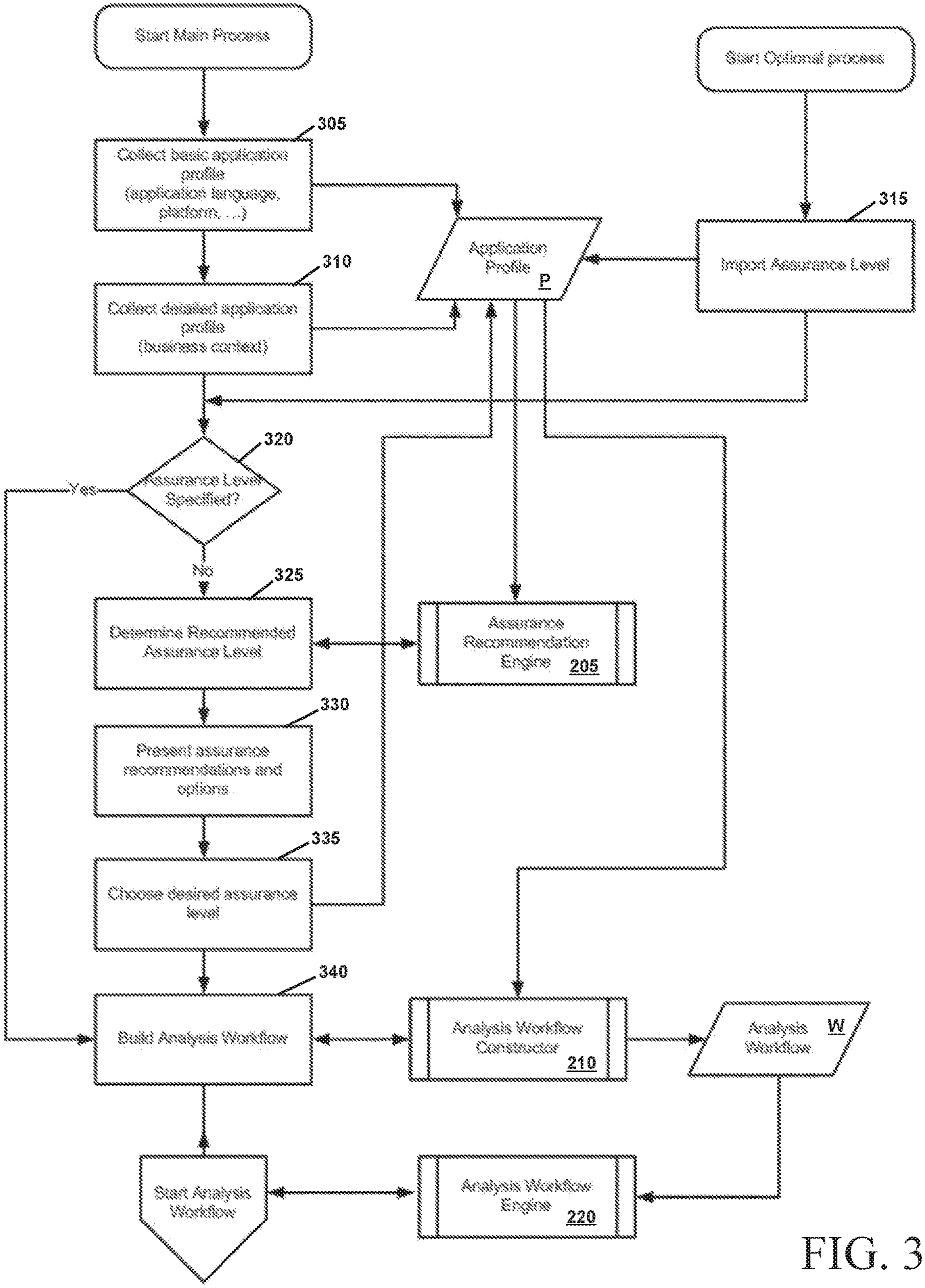
FIG. 3 is a flow chart depicting steps performed in developing a software analysis and testing workflow according to an embodiment of the invention.

Referring now to FIG. 3, one embodiment of the assessment and recommendation techniques of the invention includes three phases—a data-collection phase, an assurance-level determination phase, and a workflow-build phase. More specifically, the data-collection phase includes collecting technical details (STEP 305) about the application such as the platform on which it will be built and/or implemented, the network topology over which it will operate, the language or languages used to develop the application, third-party applications or modules the application will interact with or use, the security environment in which the application will operate, as well as other application characteristics. In addition, the business context in which the application will operate is determined (STEP 310), and combined with the technical details to produce an application profile P. In one non-limiting example, some or all of the business factors identified in the Federal Information Processing Standard (FIPS) (i.e., damage to reputation, financial loss or business liability, harm to business interests, unauthorized release of sensitive information, personal safety, civil liability and potential criminal violations) can be used as guidelines for measuring the security risks in light of the business context of the application. Each of the FIPS factors can be assigned a rating (e.g., as n/a, minimal, moderate or serious), and in some embodiments certain factors are weighted more than others according to relative importance, (e.g., as defined by a user or industry standards). For example, an application that processes healthcare data including personally identifiable information may accord a rating of "serious" to factors such as damage to reputation, liability, unauthorized release of sensitive information and criminal liability, but "n/a" for personal safety. In instances in which this analysis has previously been done and an assurance level already determined, that assurance level can be imported (STEP 315), and in some circumstances updated if necessary.

If an assurance level was provided with the application as part of the data collection phase (DECISION STEP 320), the analysis workflow can be built. Otherwise, the assurance recommendation engine reviews the application profile P and determines an appropriate assurance level (STEP 325). One approach for determining an appropriate assessment level is to consider the ratings assigned to each of the business context factors, and select an appropriate assurance level based on the highest rating. For example, if any of damage to reputation, financial loss, harm to business interests, release of sensitive information or civil or criminal violations are rated "serious," the highest assessment level is recommended. If, however, all factors are either minimal or n/a except for, e.g., the "civil violations" factor (which is assigned a "moderate" rating), a lower but still relatively high assurance level is specified. Table 1 below summarizes one possible mapping of business impact factors and their ratings to recommended assessment levels.

TABLE 1

Assurance Level Profiles
Assurance Level Impact Profiles

| Potential Business Impact Categories for Application Flaws | AL2 | AL3 | AL4 | AL5 |
|---|---|---|---|---|
| 1. Inconvenience, distress or damage to standing or reputation | Min | Mod | Mod | Serious |
| 2. Financial loss or business liability | Min | Mod | Mod | Serious |
| 3. Harm to business interests | N/A | Min | Mod | Serious |
| 4. Unauthorized release of sensitive information | N/A | Min | Mod | Serious |
| 5. Personal Safety | N/A | N/A | Min | Mod |
| 6. Civil or criminal violations | N/A | Min | Mod | Serious |

The recommended assurance level (and in some cases options to modify the level) can then be presented to the user (STEP 330), who selects the assurance level (STEP 335) for the particular application.

In the workflow build phase, varying combinations of analysis techniques can be used to adapt a security review workflow to the particular technical and business criteria of an application, with one key goal being the reduction of false negatives, i.e., undetected security flaws. Different types of analysis (e.g., automated, manual, static, dynamic, etc.) have different false negative rates because they are either unable to detect particular security defects (100% false negative rate) or they have varying levels of false negatives depending on the threat. As a result, introducing additional security analysis processes into the workflow lowers the false negative rate. But multiple analysis techniques require the expenditure of more time and resources, and so should be integrated into the workflow when they contribute meaningfully to the overall reliability of the analysis or to lower the false negative rate below a predetermined threshold.

In one implementation, the workflow W is constructed (STEP 340) by selecting different analysis techniques from the following table. The higher the desired assurance level, the more analysis techniques are recommended. The analysis techniques are arranged according to the time and resources estimated to perform the analysis, thereby minimizing costs and only introducing more stringent analyses when the impact of a security event is greater. Once the workflow is determined and approved by the user, the various analysis techniques are performed. Table 2 below illustrates how various analysis techniques may be used against applications with different assurance levels.

TABLE 2

Analysis/Assurance Level Mapping

| Analysis Techniques | Assurance Levels AL1 | AL2 | AL3 | AL4 | AL5 |
|---|---|---|---|---|---|
| Automated Static Analysis | None Required | • | • | • | • |
| Automated Dynamic Analysis | | | • | • | • |
| Manual Dynamic Analysis | | | | • | • |
| Manual Code Review | | | | | • |

Chaining and Correlation of Analysis Results

Combining multiple types of application analysis generally produces a broader application vulnerability profile. For example, combining binary static analysis and dynamic analysis techniques provides increased accuracy and more informative analysis results because the outcome of a binary static analysis can be used as input into a secondary dynamic analysis. The dynamic analysis process itself produces two results: a dynamic assessment and a static coverage map. The static coverage map contains each dynamic path used to reach a flaw detected during the static analysis.

Figure 4:
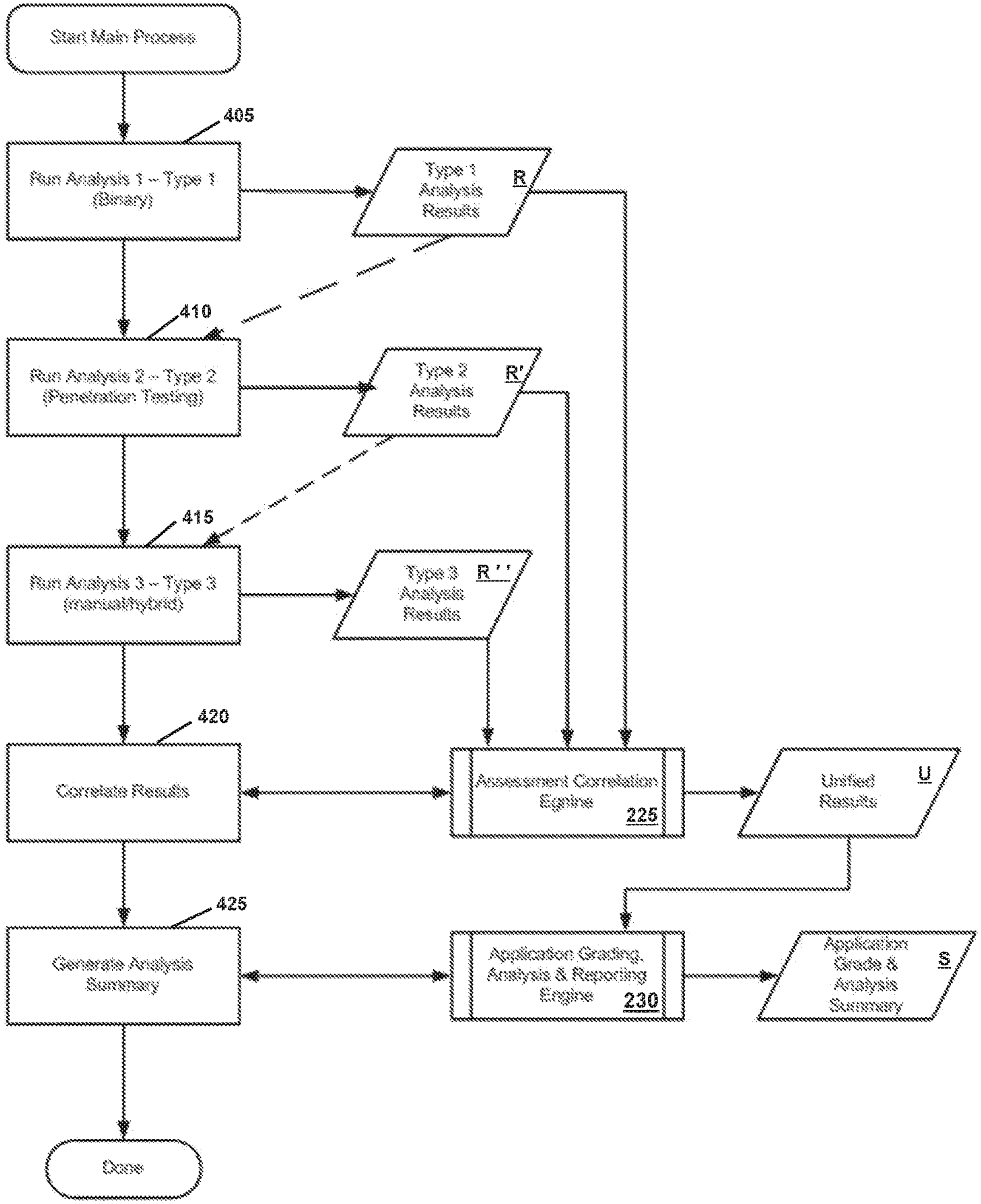
FIG. 4 is a flow chart depicting steps performed in developing a software analysis and test report according to an embodiment of the invention.

The static results, dynamic results, and static coverage map are used to produce a report of static flaws not pathed (lowest priority), static flaws with a dynamic path (high priority), and dynamic flaws not related to the portions of the application that have been statically analyzed (e.g., environment/configuration). The data flow and control flow graphs generated by static analysis may also be used to compute a dynamic test case for each identified flaw. In such cases, input data and an input vector may be generated that will recreate and retest each flaw dynamically to determine if the flaws have been addressed. More specifically, and with reference to FIG. 4, the following steps can be performed to combine results from both the static and dynamic testing:

STEP 405: Run the binary static analysis, recording the binary offset of a potential defect within the tested executable. The results R may be stored and/or used as input into the pen and dynamic testing.

STEP 410: Instrument the binary within a runtime test environment in preparation for the dynamic test. A correlation agent is executed on the same computer as the binary will execute. The correlation agent loads the binary and sets debug breakpoints or shims at each binary offset at which potential defect was detected during the binary static analysis. The results R' may be stored and/or used as input into the dynamic analysis.

STEP 415: Run the dynamic analysis. The dynamic analysis uses general test cases to find new flaws and specific test cases to retest flaws identified during the static analysis. During the analysis, the dynamic tester listens for call backs from the correlation agent running on the computer under test. If it receives a call back it records the time and information sent by the agent. During the dynamic test, if a debug breakpoint or shim is hit, the correlation agent sends a callback to the dynamic tester with information about the breakpoint or shim offset within the executable.

STEP 420: Determine, using a correlation process, which dynamic test inputs correlate to which potential defects found during binary static analysis by using the callback information.

STEP 425: Create a summary S from the correlated results U. If defects were found by both static and dynamic analysis then those defects are reported as high confidence.

Continuous Application Assurance

In some embodiments, continuous application assurance provides for automatic re-analysis of an application. Re-analysis is triggered by changes in the external application environment (e.g., threat space, business intelligence, detected attacks) and/or the implementation of enhanced analysis capabilities (e.g., a new scan has been added to an analysis workflow to detect new class of vulnerability). An intelligent re-analysis decision can be made by taking into account factors such as application profile, previous vulnerability assessment results, and the type of change (e.g., threat and/or scan capability).

A decision to initiate a re-analysis can be based, for example, on an application's technological profile, metadata describing the application's functionality, the deployment environment of the application, new information about vulnerabilities that may affect the application, and/or increases in a likelihood of a threat. External data feeds and internal scan capabilities database are used to trigger rescans of the application. For example, suppose a new vulnerability is discovered in how data is transmitted and processed using XML and Web Services that did not exist when the application was first scanned. All applications having metadata that includes both XML and Web Services are identified, and the relevant analysis workflows are updated with the new scan information and re-processed.

Figure 5:
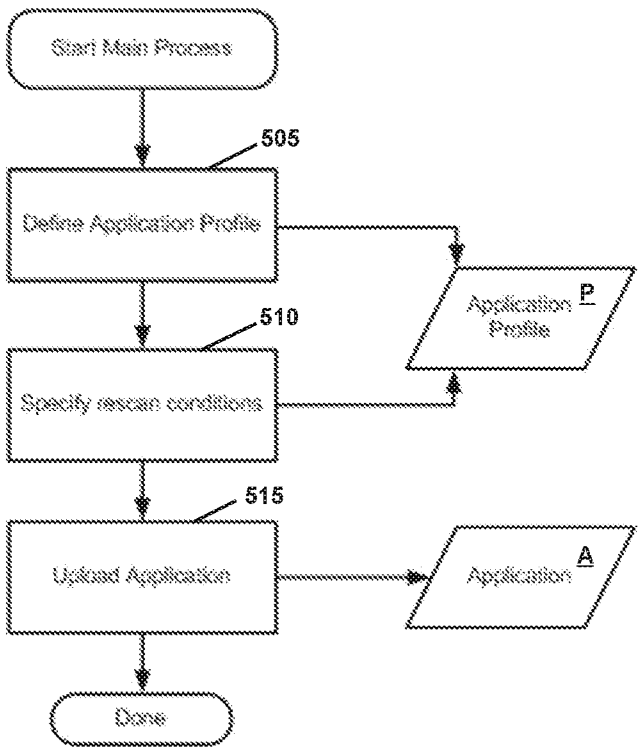
FIG. 5 is a flow chart depicting steps performed in defining and loading a software application for analysis and testing according to an embodiment of the invention.

In one embodiment, with reference to FIG. 5, the initial steps for an application-specific or customer-driven rescan include:

STEP 505: Define an application profile P for a web-based application, e.g., a J2EE-based retail brokerage application for a Fortune 100 financial services company, deployed with an Apache web front-end and backed by an Apache Tomcat application server and an Oracle database. In addition to the web interface aimed at consumers, the application has a Web Services API for exchanging data and enabling partners to conduct transactions.

STEP 510: Define rescan conditions based on the application's attack profile. In this example, any new attack vectors against Java applications or XML (for the Web Services interface) as well as attacks specifically targeting infrastructure components—Apache, Tomcat, and Oracle would constitute a rescan condition.

STEP 515: Upload the application A to the platform and perform the initial binary analysis to model the application's data flows and control flows.

In some implementations, the rescanning process may be implemented as a required step for submitting code or applications to a third-party application platform. For example, an entity that provides a suite of community-developed applications for its communications and entertainment devices (e.g., the AppStore by Apple) may, as a condition for offering an application, require the application be scanned prior to being made available to the public. The scan may be done prior to an initial upload, as well as on a periodic basis. In some instances, the scan may not be required, but a recognizable label (e.g., an icon, or image) is shown alongside the application to indicate that it has been scanned for potential vulnerabilities. In other cases, a user may be offered the application for free, but, if they want the additional assurance of having the application scanned, may pay a nominal fee (e.g., $2.99).

Figure 6:
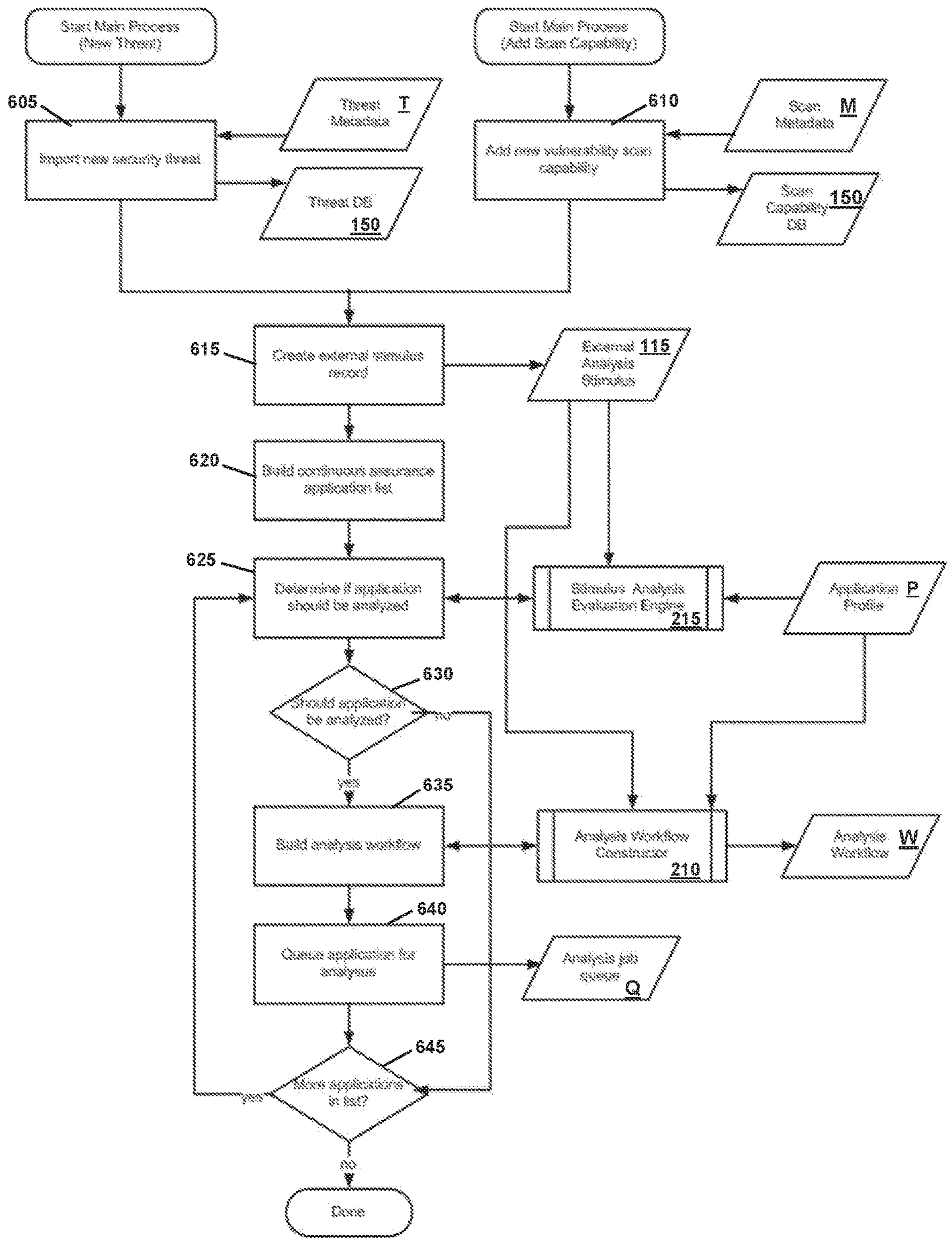
FIG. 6 is a flow chart depicting steps performed in performing periodic software application analysis and testing according to an embodiment of the invention.

In addition to single application rescans as described above, a platform-wide rescan may also be initiated in which multiple applications (possibly owned and/or operated by unrelated entities) are rescanned. In addition, application owners may "subscribe" to a periodic and/or event driven rescan service that continuously determines if rescans are necessary and if so, performs the appropriate analysis. More specifically, and referring to FIG. 6, one method for implementing a global rescan includes the following steps:

STEP 605: A new method for attacking XML interfaces is discovered and threat metadata M and general remediation information T are imported into the threat database.

STEP 610: When a new attack vector is discovered, security researchers and developers create a new scan that detects instances of the vector. The new scan capability is classified, codified, and is added to the threat database 150.

STEP 615: Generate and store a re-scan change event in the database.

STEP 620: Determine which applications are identified for continuous application assurance, and perform the following steps for each such application.

STEP 625: The stimulus analysis evaluation engine 215 uses the application profile P and the external analysis stimulus 115 to determine whether or not the application needs to be re-analyzed. For example, in the case of the XML interface threat noted above, web applications that expose an XML-based Web Services API are rescanned.

DECISION STEP 630: If the application is to be rescanned, move to Step 635, otherwise check to determine if additional applications are queued for rescan.

STEP 635: Build the analysis workflow W by comparing the external stimulus to the application profile. In some cases, it may not be necessary to re-run all of the existing scans, and instead only run the new scans that apply to the particular application.

STEP 640: Insert the application into the job queue Q along with its custom analysis workflow W.

STEP 645: Repeat the process for each application configured for continuous application assurance. For each application, either it is deemed not in need of a re-scan, or it is added to the job queue along with the corresponding workflow.

Remote Application Analysis

In some embodiments in which a static binary analysis is performed remotely (e.g., within the security assessment platform separate from the operational environment in which the application is implemented or where its source code is stored), the results of the binary analysis can be linked to the original application source. These results are typically stored and managed securely on within the platform 105, but can be viewed by a remote user together with local application source code using a viewer application.

Figure 7:
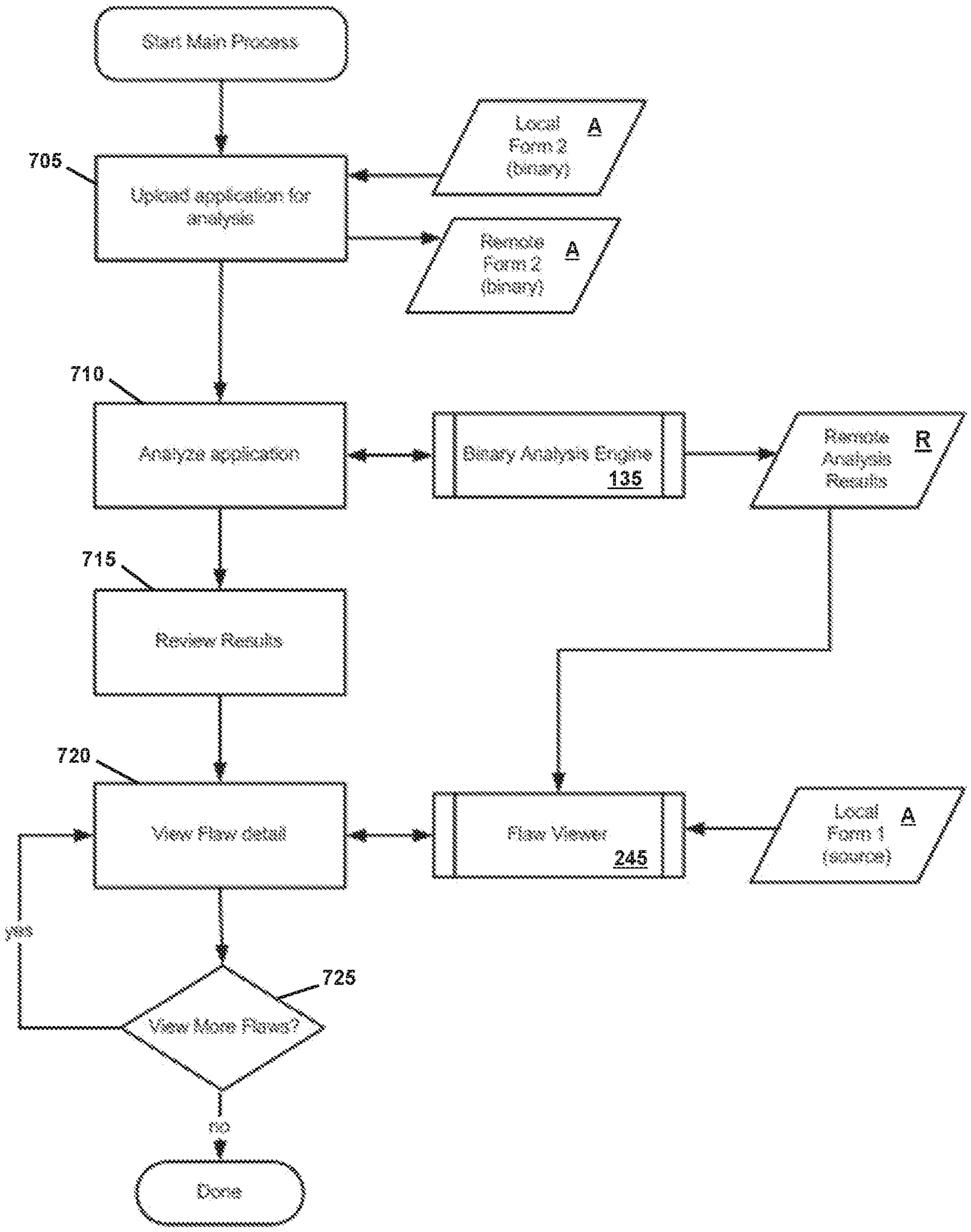
FIG. 7 is a flow chart depicting steps performed in identifying and presenting flaws in software applications.

Referring to FIG. 7, one method for providing simultaneous viewing of identified application flaws along with the application source code that caused the flaws can include the following steps:

STEP 705: Upload application metadata and application binaries A from a local system to the assessment platform for analysis.

STEP 710: Initiate static binary analysis for the application and store the results at the central location. As part of the analysis, application flaws identified in the analysis results R include references to application source code file and line number obtained using debug symbol information during the analysis.

STEP 715: An application user or owner logs into the platform using a remote application and views the list of flaws stored in the platform.

STEP 720: The user selects one or more individual flaws to view, and in response a viewer program 245 in the remote application locates and opens the associated local source code file A and navigates to the relevant line number.

STEP 725: The process iterates though all flaws or, in some cases, only those flaws identified as critical by the user.

Peer Benchmarking

In some embodiments, the platform 105 provides a common repository for application metadata as well as assessment results for numerous applications across a variety of technical and business implementations and/or of known quality. By maintaining such a database, the platform can provide cross-application reporting that compares a particular application (or family of applications) to others in the same industry, to applications that use the same technology, and/or based on other criteria rendering one class of application relevant to another. In some instances, assessment results may be compared to those generated by a template application to determine the quality of the application as compared to an application of known quality. Such reporting (referred to as "peer benchmarking") allows an organization to gauge the effectiveness of its own security initiatives relative to other companies in the same industry. Because the assessment platform provides consistent and repeatable security-analysis techniques, a common assessment vocabulary and a large sample size, the information provided to users has a greater global relevance than individual application assessment data.

Figure 8:
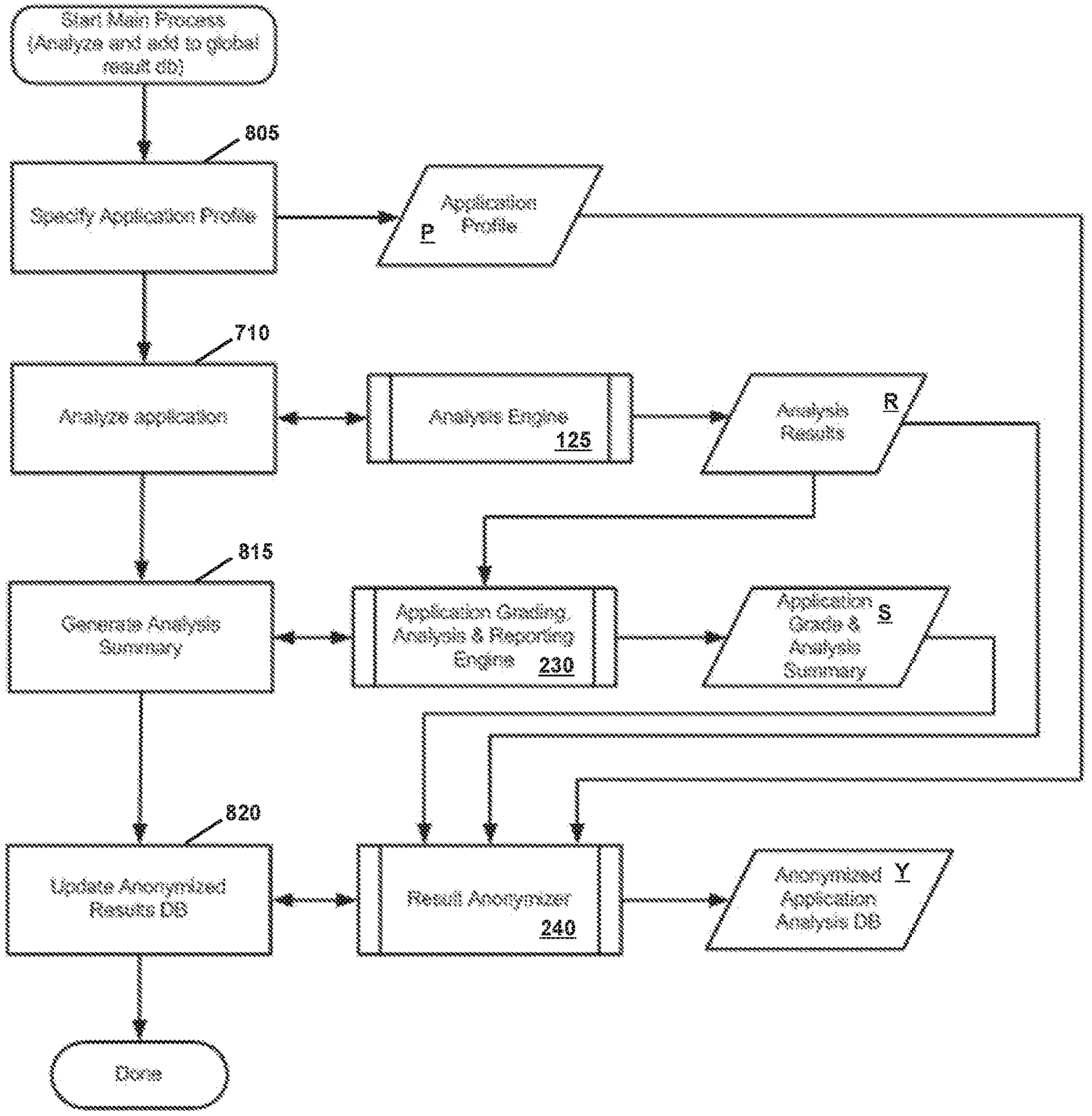
FIG. 8 is a flow chart depicting steps performed in accumulating results from multiple software application analyses and tests according to an embodiment of the invention.

Referring to FIG. 8, one method for providing peer benchmarking reporting to users of the platform includes the following steps:

STEP 805: The application profile P is specified based on the type of application and the business context. One example is a customer-facing financial services web application written in java.

STEP 710: The application is analyzed using a consistent, repeatable process as described above.

STEP 815: A standardized analysis summary S is generated by the reporting engine 230 that contains an overall security score and other security metrics.

STEP 820: The analysis summary is anonymized so that the summary cannot be traced back to the original application, the organization that created the application, or the organization that submitted the application for analysis. The anonymous summary Y may be loaded into the assessment results database.

Figure 9:
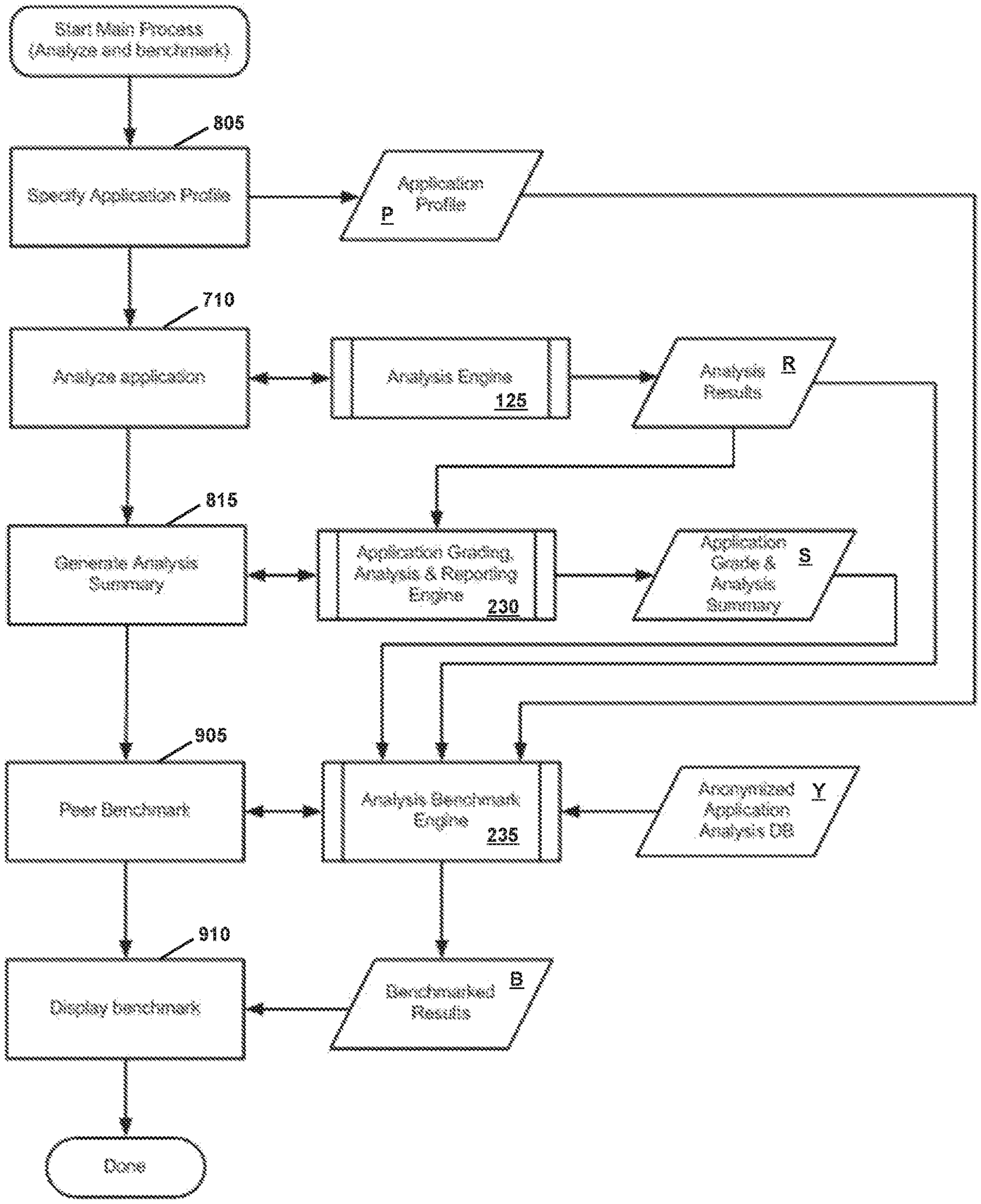
FIG. 9 is a flow chart depicting steps performed in providing software analysis and testing benchmarks according to an embodiment of the invention.

Once the results database 155 is populated with assessment results from a sufficient number of applications, users can specify and view various reports. Some reports, for example, can indicate how, statistically, an application compares to its "peers" by indicating the percentage of all assessed applications (or some subset thereof) that resulted in fewer potential vulnerabilities. In one example, with reference to FIG. 9, the benchmark reporting process can include the following steps:

STEP 805: The application profile P is specified based, for example, on the type of application and/or the business context.

STEP 710: The application is analyzed using a consistent, repeatable process of determining, building and executing appropriate tests as described above.

STEP 815: A standardized analysis summary S is generated by the reporting engine 230 that contains an overall security score and other security metrics.

STEP 905: The assessment results database 155 is queried using the specified application profile(s). In some embodiments, a first query can be executed looking for exact or very close matches to the profiles. For example, if the application profile is "customer-facing financial services web application written in Java" and the database contains a sufficient number of assessment for a meaningful peer benchmark to be compiled, (e.g., n>5), the application results R are compared to the anonymous results Y by, for example, placing the subject application in a designated quartile or decile. If the number of results is insufficient, the query parameters may be expanded to include results from applications that have similar (but not necessarily exact) profiles until a desired result set is obtained.

STEP 910: The peer benchmark data B may be displayed in tabular and/or graphical format (e.g., a histogram) showing, for example, the count of similar applications that scored in each quartile. Application profiles of the anonymous applications can also be shown along with the summary report.

Secure Delivery of Assessment Data

The vulnerability assessment process consumes and produces data that is considered highly confidential by most organizations. For example, input into the analysis phase can include application source code, application binaries and debug symbols, and/or environment data (URLs, usernames/passwords, site maps). Because of the sensitive nature of this data, and because they indicate potentially exploitable security flaws in the associated application, provision is desirably made to keep the analysis results confidential. In instances in which the platform is operated as a centralized, offsite service, the need to secure this sensitive information becomes even more crucial. In various embodiments, the DRM packager 250 and engine 255 provide the following capabilities:

A secure "container" file that contains the assessment data in a structured and encrypted form that can only be produced and consumed by the DRM technology employed by the platform 105.

An API or application that transforms structured data into a secure container and specifies the access control rules for the contents of the secure container.

Secure container content access to a known/trusted application when the access control rules are satisfied (typically specified by the presence of a DRM license bound to the user and client hardware).

An access token that provides access granting data (e.g., time, machine hardware id, username, IP address, license id, etc.) to allow access to structured data within the secure containers.

Using the DRM engine 255, steps may be taken to protect the initial data provided as input to the assessment process as well as the analysis results. Once the submission data has been packaged into a secure container, access is granted to the trusted analysis application for the duration of the analysis. Analysis results can then be packaged into a secure container for remote viewing. A trusted secure viewer application (in conjunction with the DRM Client engine and access token) ensures that the analysis results are viewed by authorized users and prevents unauthorized copying via printer, cut/paste, print screen, or file copy.

Figure 10:
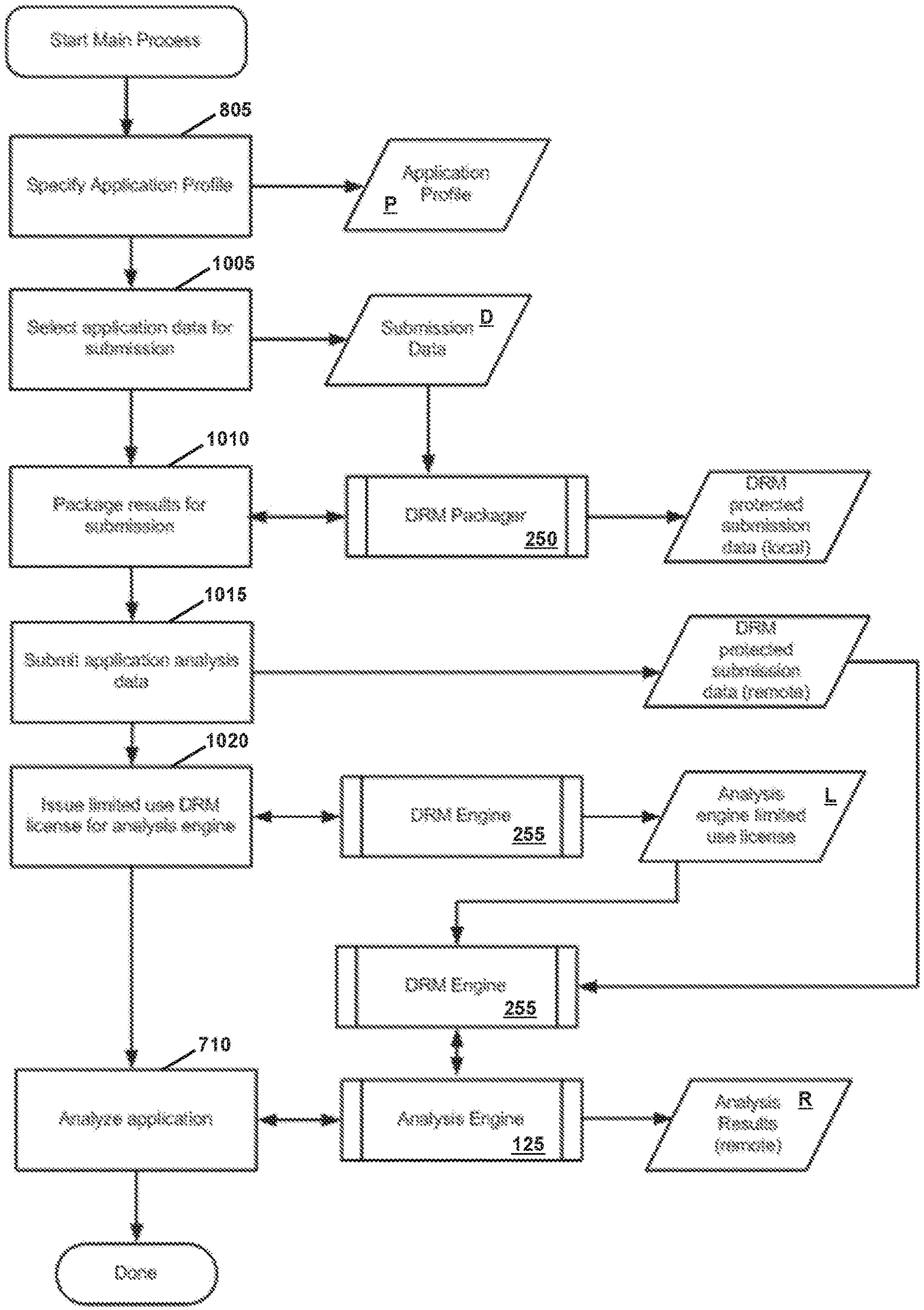
FIG. 10 is a flow chart depicting steps performed in securely submitting software applications for analysis and testing according to an embodiment of the invention.

Referring to FIG. 10, the following steps provide the secure receipt and analysis of application source files and assessment data to and within the platform:

STEP 805: Create a remote application profile P using the application metadata provided by the user and/or identified from the application itself.

STEP 1005: Identify the input data D to the application analysis, either manually by a user or automatically by the analysis engine (e.g., a list of binary files, a list of source code files, etc.)

STEP 1010: Place the submission data D in a secure container using the DRM packager 250.

STEP 1015: Submit the secure container to the platform for analysis as described above.

STEP 1020: Using the DRM engine 255, issue a limited-use DRM license to the analysis engine to allow access to the analysis input data.

STEP 710: The analysis engine 125 performs the prescribed analyses using the DRM engine 255 and issued license to access input data, and the output is stored in a secure database.

Figure 11:
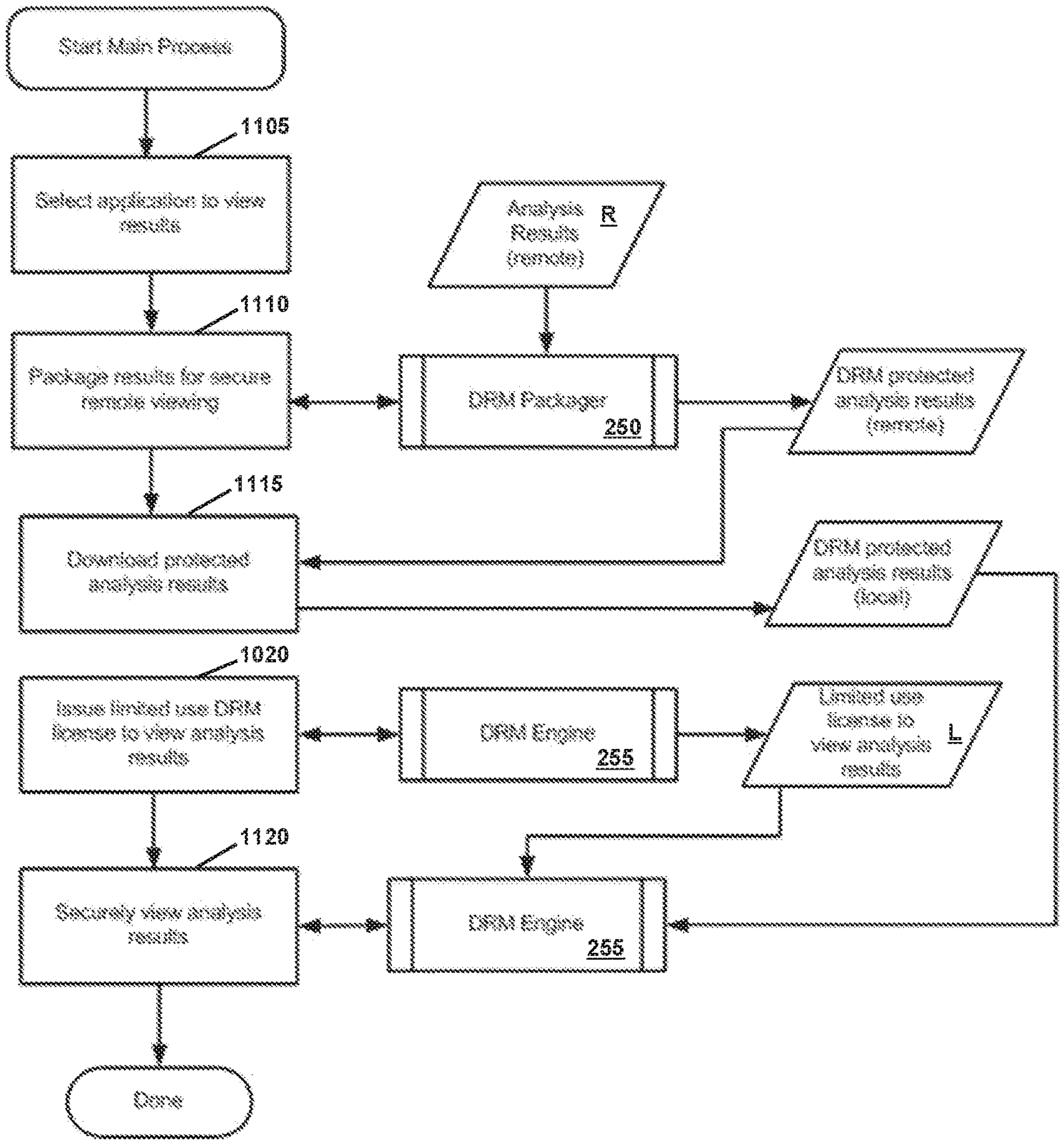
FIG. 11 is a flow chart depicting steps performed in securely viewing software application analysis and testing results according to an embodiment of the invention.

Referring to FIG. 11, once the analysis data is stored in the database, it can then be packaged and transmitted using similar DRM techniques and the following steps:

STEP 1105: A user selects an application for which he wishes to view the analysis results R from a remote site.

STEP 1110: The analysis results R are placed in a secure container using the DRM packager 250 for viewing.

STEP 1115: The secure container is downloaded to a local machine from the platform for viewing by the user.

STEP 1020: A limited-use license is granted to the local machine to allow viewing of analysis results contained in the secure container. The license limits use to the target machine, the user, or in some embodiments, a combination of the two.

STEP 1120: The secure viewer displays the analysis results from the secure container. The data is persistently protected and operations like cut/paste/screen dump are disabled.

In some implementations, security analysis and vulnerability testing results may be "packaged" or "bound to" the actual software it describes. In some cases, the software may be a commercially-available product delivered via traditional methods such as CD-ROM or download, whereas in other cases the software may be a website or collection of websites that provide the software and/or services over the Internet, commonly referred to as software as a service, or "SaaS". In still other cases, software may refer to a collective of otherwise unrelated applications and services available over the internet, each performing separate functions for one or more enterprises, (i.e., "cloud" computing). By linking the report to the software itself, downstream users of the software can access information about the software, make informed decisions about implementation of the software, and analyze the security risk across an entire system by accessing all (or most) of the reports associated with the executables running on the system and summarizing the risks identified in the reports.

Numerous techniques may be used for binding the report to and/or associating the report with the executable. In some implementations, for example, the binding can be "weak" in that the executable name and version number are listed in the report and referenced either manually or automatically. If the report information is accessed programmatically, an executable a query can be submitted to a database storing a collection of software security reports and the desired report retrieved. The database may be private (e.g., behind a firewall and accessible only to authorized users or employees) or public, and made available via the Internet to the general population for query and review.

In other instances, the report may be “loosely” bound to the software by computing a cryptographically secure hash of the software and including the hash in the body, metadata or header of the report. In such cases, users of the software are provided with a hash program that computes the required hash and submits the hash as a lookup key to a database of reports. In this instance, the reports remain somewhat “decoupled” from the software as there may be many report providers and the reports may be updated over time without needing to redistribute the software which is desirable given the ever-changing threat landscape.

In another implementation, a “strong” binding between the software and its vulnerability report uses a URL as a unique reference address of the report or, in some cases, the report is embedded alongside software binaries in environments that support application packages. While not as flexible as the weak or loose techniques described above, no lookup is needed and the report can “travel” with the software. For environments that support application packages (WAR, EAR, JAR, Mac OS X app packages) the report is a file alongside the manifest in the bundle.

The vulnerability reports can be expressed in an XML format so that automated processes can query the report based on predetermined tags and find the information needed to make security decisions regarding the executable. The report may be cryptographically signed by the report provider so that tampering with the report contents can be detected—particularly important when the report is embedded in the binary or included in an application package. An example of XML that may be used to generate a report (or a portion of a report) is provided in the table below:

```
<?xml version=“1.0” encoding=“ISO-8859-1” ?>
- <detailedreport xmlns=“http://www.veracode.com/schema/reports/export”
    report format version=“1.1” app
    name=“Sample Application” version=“1.0”
    platform=“Java” generation date=“2009-09-17 18:30:34 UTC”>
- <static-analysis>
- <modules>
  <module name=“sample.war” compiler=“JAVAC 6” os=“Java J2SE 6”
    architecture=“JVM” score=“58” numflawssev1=“0”
    numflawssev2=“14”
    numflawssev3=“258” numflawssev4=“7” numflawssev5=“0” />
    </modules>
    </static-analysis>
- <dynamic-analysis>
- <modules>
  <module name=“dynamic analysis” compiler=““os=”“ architecture=””
  score=“98”
    numflawssev1=“0” numflawssev2=“2” numflawssev3=“2”
    numflawssev4=“0”
    numflawssev5=“0” />
    </modules>
    </dynamic-analysis>
  <severity level=“5” />
- <severity level=“4” >
- <category categoryid=“19” categoryname=“SQL Injection”
pcirelated=“true”>
- <desc>
  <para text=“SQL injection vulnerabilities occur when
    data enters an application
    from an untrusted source and is used to dynamically
    construct a SQL query.
    This allows an attacker to manipulate database queries in order to
    access, modify, or delete arbitrary data. Depending on the platform,
    database type, and configuration, it may also be possible to execute
    administrative operations on the database, access the filesystem, or
```

-continued

```
    execute arbitrary system commands. SQL injection attacks can
    also be used to subvert authentication and authorization schemes,
    which would enable an attacker to gain privileged access to
    restricted portions of the application.” />
    </desc>
- <recommendations>
- <para text=Several techniques can be used to prevent
SQL injection attacks.
    These techniques complement each other and address
    security at different points in the application.
     Using multiple techniques provides defense-in-depth
     and minimizes the likelihood of a SQL injection vulnerability.”>
  <bulletitem text=“Use parameterized prepared statements rather than
    dynamically constructing SQL queries. This will prevent the database
    from interpreting the contents of bind variables as part of the query
     and is the most effective defense against SQL injection.” />
  <bulletitem text=“Validate user-supplied input using positive
    filters (white lists) to ensure that it conforms to the
    expected format, using centralized data validation
    routines when possible.” />
  <bulletitem text=“Normalize all user-supplied data before
    applying filters or regular expressions, or
    submitting the data to a database. This means that
    all URL-encoded (%xx), HTML-encoded (&#xx;), or other encoding
    schemes should be reduced to the internal character representation
    expected by the application. This prevents attackers from using
    alternate encoding schemes to bypass filters.” />
  <bulletitem text=“When using database abstraction libraries
    such as Hibernate, do not assume that all
    methods exposed by the API will automatically prevent
    SQL injection attacks. Most libraries contain methods that pass
    arbitrary queries to the database in an unsafe manner.” />
    </para>
    </recommendations>
- <cwe cweid=“89” cwename=“Failure to Preserve SQL
    Query Structure (‘SQL Injection’)” pcirelated=“true”>
- <description>
  <text text=“This database auery contains a SQL injection flaw. The
    function call constructs a dynamic SQL query using a variable
    derived from user-supplied input. An attacker could exploit this
    flaw to execute arbitrary SQL queries against the database.” />
    </description>
- <staticflaws>
- <flaw issueid=“83” module=“sample.war” severity=“4”
    type=“Failure to Preserve
    SQL Query Structure (‘SQL Injection’)” description=“This database
    query contains a SQL injection flaw. The call to
    java.sql.Statement.executeQuery( )
    constructs a dynamic SQL query using a variable
    derived from user-supplied
    input. An attacker could exploit this flaw to execute arbitrary SQL
    queries against the database. Avoid dynamically constructing
    SQL aueries. Instead,
    use parameterized prepared statements to prevent the database from
    interpreting the contents of bind variables as part of the query.
Always
    validate user-supplied input to ensure that it conforms to the expected
    format, using centralized data validation routines when possible.
    References: CWE (http://cwe.mitre.org/data/definitions/89.html)
    OWASP (http://www.owasp.org/index.php/SQL injection)”
    note=“” cweid=“89” remediationeffort=“3”
    exploitLevel=“0” sourcefile=“sample1.java” line=“213”
    sourcefilepath=“org/sample/utils”>
- <mitigations>
  <mitigation action=“Mitigated by Design” description=“The tainted data
    in this case comes from locked down database system tables.”
    user=“Demo User” date=“2009-09-04 14:12:34 UTC” />
  <mitigation action=“Mitigation Accepted”
  description=“This makes sense.”
    user=“Demo User” date=“2009-09-04 14:12:53 UTC” />
    </mitigations>
- <exploitability adjustments>
- <exploitability adjustment score adjustment=“−1”>
  <note>The source of the tainted data in this web application
    flaw is not a web request.</note>
    </exploitability adjustment>
    </exploitability adjustments>
    </flaw>
- <flaw issueid=“151” module=“sample.war” severity=“4”
    type=“Failure to Preserve
```

-continued

```
SQL Query Structure ('SQL Injection')" description="This database
query contains a SQL injection flaw. The call to
java.sql.Statement.executeUpdate( ) constructs a dynamic
SQL Query using a variable derived from user-supplied input.
An attacker could exploit this flaw to execute arbitrary SQL
queries against the database. Avoid dynamically constructing
SQL Queries. Instead, use parameterized prepared
statements to prevent the database from interpreting the contents of
bind variables as part of the querv. Always validate
user-supplied input to ensure that it conforms to the
expected format, using centralized data
validation routines when possible. References: CWE
(http://cwe.mitre.org/data/definitions/89.html) OWASP
(http://www.owasp.org/index.php/SQL injection)" note="" cweid="89"
remediationeffort="3" exploitLevel="0" sourcefile="sample1.java"
line="220"
sourcefilepath="org/sample/utils">
- <exploitability adjustments>
- <exploitability adjustment score adjustment="−1">
 <note>The source of the tainted data in this web application flaw is
  not a web request.</note>
  </exploitability adjustment>
  </exploitability adjustments>
  </flaw>
```

One example of an automated process that references a bound vulnerability report may include a whitelisting agent operating as software. The software agent may execute on a server or client, including hand-held devices, smart phones, PDAs, and the like. Procedurally, the agent computes the hash value for the executable for which it is attempting to validate and sends the hash to its whitelist database. If the hash is in the whitelist, the executable is permitted to execute (or be installed, copied, transferred or otherwise used). Conventional whitelisting databases only consider software provenance when making a binary decision whether to allow the software to execute—if the provenance is known it runs, if not, the software is not executed. In contrast, the whitelist agent described herein takes advantage the software security report to make a more informed decision based on numerous data points. For example, an overall software quality rating or the number and type of known security defects may affect the decision whether to execute the software or not, or under what conditions the software may be executed.

For example, an organization may have a policy stating that a web application on the external network cannot have any cross-site scripting (XSS) vulnerabilities yet software running on the internal network may allow XSS vulnerabilities. The policies used by the whitelisting agents running externally can refer to the software security report for a count of XSS defects, and if the count is non-zero, restrict the execution of the software.

In other cases, the security report may be used to verify that proper change and release processes were followed for new versions of the software. In a controlled change and release process, decision gates may be used to control a release of the software into a production environment or for use as a gold disk for reproduction. With the report bound to an executable, an automated scanning application may investigate a production environment and verify the efficacy of the change and release process by ensuring that all deployed binaries have a recent report and a valid security rating.

In another example in which software is distributed through a central repository (e.g., SourceForge, iTunes App Store, BlackBerry AppWorld, Android Marketplace, etc.) bound security reports offer a higher assurance level to the consumer because the application has been rated for security and not tampered with prior to downloading. In some instances the reports may be made available through the same central repository. In certain instances, the software vendor may make one version of the application available for free or a reduced price, but another version that includes the security report (or access to it) available at a higher price, as some customers may appreciate the added value and security that access to the report and data provides.

The bound security report may also be used in conjunction with an application installation process for desktop or server applications. Where today operating systems such as Windows Vista alert the user if an unsigned application is to be installed, a future system might detect the presence of a ratings report and display it, or alert to the absence of a ratings report. Similarly, bound security reports may be used to strengthen browser security policies by providing more information about the applet to be run.

The invention can be embodied in other specific forms without departing from the spirit or essential characteristics thereof. The foregoing embodiments are therefore to be considered in all respects illustrative rather than limiting on the invention described herein.

What is claimed is:

1. A method comprising:

determining a profile of a first software application based, at least in part, on metadata of the first software application, wherein the metadata comprise at least one of a first technical characteristic of the first software application and a first business context characteristic of a business context in which the first software application will operate;

determining at least a static analysis and a dynamic analysis to perform for the first software application based, at least in part, on the profile of the first software application;

analyzing the first software application with the static analysis to generate static analysis results;

analyzing the first software application with the dynamic analysis to generate dynamic analysis results; and generating an assessment report based on the static analysis results and the dynamic analysis results, wherein the assessment report indicates a security score of the first software application that is based, at least in part, on the static analysis results and the dynamic analysis results.

2. The method of claim 1, wherein the static analysis results indicate a first set of defects, and wherein the dynamic analysis results indicate a second set of defects.

3. The method of claim 2 further comprising indicating a severity of at least a subset of the first and second sets of defects.

4. The method of claim 1 further comprising determining an assurance level of the first software application based on the profile of the first software application.

5. The method of claim 4, wherein determining at least the static analysis and the dynamic analysis comprises determining the static analysis and the dynamic analysis based on the assurance level of the first software application.

6. The method of claim 1 further comprising correlating the static analysis results and the dynamic analysis results to generate correlated results, wherein generating the assessment report comprises generating the assessment report based on the correlated results.

7. The method of claim 1 further comprising comparing the assessment report to assessment reports for other software applications having profiles that are similar to the profile of the first software application.

8. The method of claim 1, wherein analyzing the first software application with the dynamic analysis comprises analyzing the first software application with the dynamic analysis to retest at least a first defect indicated in the static analysis results.

9. A non-transitory, machine-readable medium comprising instructions executable by a computing device to perform operations comprising:

determining a profile of a first application based, at least in part, on metadata of the first application, wherein the metadata comprise at least one of a first technical characteristic of the first application and a first business context characteristic of a business context in which the first application will operate;

selecting two or more security tests for the first application based, at least in part, on the profile of the first application, wherein the two or more security tests comprise a static analysis and a dynamic analysis;

based on analyzing the first application with the two or more security tests, generating results of the two or more security tests, wherein the results at least comprise static analysis results and dynamic analysis results; and generating an assessment results report for the first application based, at least in part, on the results of the two or more security tests, wherein the assessment results report indicates a security score of the first application.

10. The non-transitory, machine-readable medium of claim 9, wherein the static analysis results indicate a first set of defects, and wherein the dynamic analysis results indicate a second set of defects.

11. The non-transitory, machine-readable medium of claim 10 further comprising instructions for indicating a severity of at least a subset of the first and second sets of defects.

12. The non-transitory, machine-readable medium of claim 9 further comprising instructions for determining an assurance level of the first application based on the profile of the first application.

13. The non-transitory, machine-readable medium of claim 12, wherein selecting the two or more security tests comprises selecting the two or more security tests based on the assurance level of the first application.

14. The non-transitory, machine-readable medium of claim 9 further comprising instructions for correlating the static analysis results and the dynamic analysis results to generate correlated results, wherein generating the assessment results report comprises generating the assessment results report based on the correlated results.

15. A system comprising:

a processor; and a computer-readable medium having instructions stored thereon that are executable by the processor to cause the system to, determine a profile of a first software application based, at least in part, on metadata of the first software application, wherein the metadata comprise at least one of a first technical characteristic of the first software application and a first business context characteristic of a business context in which the first software application will operate;

determine at least a static analysis and a dynamic analysis to perform for the first software application based, at least in part, on the profile of the first software application;

analyze the first software application with the static analysis to generate static analysis results;

analyze the first software application with the dynamic analysis to generate dynamic analysis results; and generate an assessment report based on the static analysis results and the dynamic analysis results, wherein the assessment report indicates a security score of the first software application that is based, at least in part, on the static analysis results and the dynamic analysis results.

16. The system of claim 15, wherein the static analysis results indicate a first set of defects, and wherein the dynamic analysis results indicate a second set of defects.

17. The system of claim 16, further comprising instructions executable by the processor to cause the system to indicate a severity of at least a subset of the first and second sets of defects.

18. The system of claim 15 further comprising instructions executable by the processor to cause the system to determine an assurance level of the first software application based on the profile of the first software application.

19. The system of claim 18, wherein the instructions executable by the processor to cause the system to determine at least the static analysis and the dynamic analysis comprise instructions executable by the processor to cause the system to determine the static analysis and the dynamic analysis based on the assurance level of the first software application.

20. The system of claim 15 further comprising instructions executable by the processor to cause the system to correlate the static analysis results and the dynamic analysis results to generate correlated results, wherein the instructions executable by the processor to cause the system to generate the assessment report comprise instructions executable by the processor to cause the system to generate the assessment report based on the correlated results.

* * * * *